United States Patent
Sun et al.

(10) Patent No.: US 10,083,145 B2
(45) Date of Patent: *Sep. 25, 2018

(54) MOTHERBOARD MODULE HAVING SWITCHABLE PCI-E LANE

(71) Applicant: GIGA-BYTE TECHNOLOGY CO.,LTD., New Taipei (TW)

(72) Inventors: Pei-Hua Sun, New Taipei (TW); Hon-Yeh Lee, New Taipei (TW); Yen-Yun Chang, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 154 days.

This patent is subject to a terminal disclaimer.

(21) Appl. No.: 15/255,166

(22) Filed: Sep. 2, 2016

(65) Prior Publication Data

US 2018/0011814 A1 Jan. 11, 2018

(30) Foreign Application Priority Data

Jul. 6, 2016 (TW) .............................. 105121436 A

(51) Int. Cl.
G06F 13/42 (2006.01)
G06F 13/40 (2006.01)

(52) U.S. Cl.
CPC ...... *G06F 13/4282* (2013.01); *G06F 13/4022* (2013.01); *G06F 13/4068* (2013.01); *G06F 2213/0026* (2013.01)

(58) Field of Classification Search
CPC ............. G06F 13/4282; G06F 13/4022; G06F 13/4068; G06F 2213/0026

USPC ........................................................ 710/301
See application file for complete search history.

(56) References Cited

U.S. PATENT DOCUMENTS

| | | | | |
|---|---|---|---|---|
| 7,174,416 B2 * | 2/2007 | Hasbun | .............. | G06F 12/0246 711/103 |
| 7,246,190 B2 * | 7/2007 | Nguyen | ................ | G06F 13/405 370/402 |
| 7,340,557 B2 | 3/2008 | Kong et al. | | |
| 7,480,757 B2 | 1/2009 | Atherton et al. | | |
| 7,600,112 B2 | 10/2009 | Khatri et al. | | |
| 7,711,886 B2 * | 5/2010 | Foster, Sr. | ............ | G06F 13/409 710/307 |
| 8,103,993 B2 | 1/2012 | Atherton et al. | | |

(Continued)

OTHER PUBLICATIONS

"Office Action of Taiwan Counterpart Application", dated Feb. 2, 2017, p. 1-p. 7, in which the listed references were cited.

*Primary Examiner* — Christopher Shin
(74) *Attorney, Agent, or Firm* — JCIPRNET

(57) ABSTRACT

A motherboard module having switchable PCI-E lanes includes a CPU, a first PCI-E slot, a second PCI-E slot, a first switch, and a second switch. 1st to a-th processor pin sets of the CPU are switchably electrically connected to 1st to a-th first PCI-E pin sets of the first PCI-E slot or (2N−a+1)th to 2N-th second PCI-E pin sets of the second PCI-E slot via the first switch to form PCI-E lanes whose number is a. (a+1)-th to 2N-th processor pin sets of the CPU are connected to the second input terminal of the second switch, and the second output terminal of the second switch is switchably electrically connected to (a+1)-th to 2N-th first PCI-E pin sets of the first PCI-E slot or 1st to (2N−a)th second PCI-E pin sets of the second PCI-E slot to form PCI-E lanes whose number is 2N−a, wherein 1<a<2N.

18 Claims, 5 Drawing Sheets

(56) References Cited

U.S. PATENT DOCUMENTS

| | | | |
|---|---|---|---|
| 9,870,333 B1* | 1/2018 | Lam | G06F 13/4068 |
| 2007/0139423 A1* | 6/2007 | Kong | G09G 5/363 |
| | | | 345/502 |
| 2013/0046914 A1* | 2/2013 | Weng | G06F 13/409 |
| | | | 710/316 |
| 2014/0129753 A1* | 5/2014 | Schuette | G06F 13/4068 |
| | | | 710/301 |
| 2015/0347345 A1* | 12/2015 | Hellriegel | G06F 13/409 |
| | | | 710/301 |
| 2016/0147628 A1* | 5/2016 | Arroyo | G06F 11/2247 |
| | | | 714/43 |
| 2018/0011713 A1* | 1/2018 | Sun | G06F 9/4401 |

* cited by examiner

MOTHERBOARD MODULE HAVING SWITCHABLE PCI-E LANE

CROSS-REFERENCE TO RELATED APPLICATION

This application claims the priority benefit of Taiwan application serial no. 105121436, filed on Jul. 6, 2016. The entirety of the above-mentioned patent application is hereby incorporated by reference herein and made a part of this specification.

BACKGROUND OF THE INVENTION

Field of the Invention

The invention relates to a motherboard module, and more particularly, to a motherboard module having switchable PCI-E lanes.

Description of Related Art

The PCI-E interface is a common external expansion interface card interface currently used in computers. This technique was originally designed to achieve high-speed data transmission. In particular, the PCI-E interface provides a dedicated bus to each equipment. Data is transmitted in series via send and receive signals referred to as lanes in a packaged format, and each lane of the third-generation PCI-E interface has the speed of 8 gb/s in single direction. A plurality of lanes can be combined to form ×1, ×2, ×4, ×8, ×12, ×16, even ×32 lane bandwidths.

In an average high-end computer, two or more than two PCI-E slots are generally provided. The BIOS in the computer detects which PCI-E slots the PCI-E expansion cards are inserted in, and instructs the CPU how to assign the PCI-E lanes to the first PCI-E slot (generally the PCI-E slot adjacent to the CPU) and the second PCI-E slot (generally the PCI-E slot farther from the CPU) according to the detection results.

More specifically, FIG. 1 and FIG. 2 are schematics of PCI-E lanes of a known CPU assigned in two PCI-E slots. Referring to FIG. 1 and FIG. 2, a ROM 30 stores a BIOS. A memory 32 is electrically connected to the ROM 30 and a CPU 10, and after booting, the BIOS is loaded in the memory 32 and receives a signal of whether an expansion card is inserted in a first PCI-E slot 11 and a second PCI-E slot 12. The BIOS controls the switch 16 to switch the PCI-E lanes according to the received information.

More specifically, the PCI-E lanes are assigned from a leftmost PCI-E pin set in each PCI-E slot (leftmost first PCI-E pin set 21 of the first PCI-E slot 11 and leftmost second PCI-E pin set 22 of the second PCI-E slot 12 in FIG. 1 and FIG. 2) to the right in order. In the case that the CPU 10 supports ×16 PCI-E lanes (such as 16 PCI-E lanes numbered 00 to 15), 8 PCI-E lanes numbered 00 to 07 are formed between first 8 processor pin sets 20 of the CPU 10 and the first 8 first PCI-E pin sets 21 of the first PCI-E slot 11. 8 PCI-E lanes numbered 08 to 15 are switched to the second-half of the first PCI-E pin sets 21 of the first PCI-E slot 11 or the first-half of the second PCI-E pin sets 22 of the second PCI-E slot 12 according to the insertion state of the expansion card.

Therefore, if an expansion card is only inserted in the first PCI-E slot 11, then the BIOS instructs the CPU 10 to switch the 8 PCI-E lanes numbered 08 to 15 to the first PCI-E pin sets 21 of the first PCI-E slot 11. That is, 1st to 16th first PCI-E pin sets 21 of the first PCI-E slot 11 are assigned to 16 PCI-E lanes numbered 00 to 15 in order and are provided to the ×16 PCI-E signal of the first PCI-E slot 11 as shown in FIG. 1.

If an expansion card is inserted in both PCI-E slots, then the BIOS instructs the CPU 10 to switch the 8 PCI-E lanes numbered 08 to 15 to the first-half of the second PCI-E pin sets 22 of the second PCI-E slot 12. In other words, 1st to 8th first PCI-E pin sets 21 of the first PCI-E slot 11 are assigned to 8 PCI-E lanes numbered 00 to 07 in order, 1st to 8th second PCI-E pin sets 22 of the second PCI-E slot 12 are assigned to 8 PCI-E lanes numbered 08 to 15 in order, and are respectively provided to two PCI-E slots ×8, ×8 PCI-E signals as shown in FIG. 2. In other words, currently, the second PCI-E slot 12 can at most receive half of the PCI-E signal.

However, since the size of the heat sink of the current high-performance CPU 10 is large, after installation, mechanical interference with the first PCI-E slot 11 may occur, or if the first PCI-E slot 11 is damaged, then the user can only insert the expansion card in the second PCI-E slot 12. However, currently, the second PCI-E slot 12 can only receive half of the PCI-E signal such that performance is reduced.

SUMMARY OF THE INVENTION

The invention provides a motherboard module having switchable PCI-E lanes, and the second PCI-E slot thereof can receive a complete PCI-E signal.

A motherboard module having switchable PCI-E lanes of the invention includes a CPU, a first PCI-E slot, a second PCI-E slot, a first switch, and a second switch. The CPU includes 2N processor pin sets. The first PCI-E slot is electrically connected to the CPU and includes 2N first PCI-E pin sets. The second PCI-E slot is electrically connected to the CPU and includes 2N second PCI-E pin sets. The first switch includes a first input terminal and a first output terminal which is switchable. The second switch includes a second input terminal and a second output terminal which is switchable. 1st to a-th processor pin sets of the CPU are electrically connected to the first input terminal, and the first output terminal is switchably electrically connected to 1st to a-th of the first PCI-E pin sets of the first PCI-E slot or (2N−a+1)th to 2N-th of the second PCI-E pin sets of the second PCI-E slot to form PCI-E lanes whose number is a. (a+1)th to 2N-th processor pin sets of the CPU are electrically connected to the second input terminal, and the second input terminal is switchably electrically connected to (a+1)th to 2N-th of the first PCI-E pin sets of the first PCI-E slot or 1st to (2N−a)th of the second PCI-E pin sets of the second PCI-E slot to form PCI-E lanes whose number is 2N−a, wherein 1<a<2N.

In an embodiment of the invention, the motherboard module further includes a BIOS receiving a signal of whether a first expansion card and a second expansion card are inserted in the first PCI-E slot and the second PCI-E slot, wherein when the second expansion card is inserted in the second PCI-E slot, the BIOS instructs the CPU to reverse an order of the electrically-connected PCI-E lanes between the CPU and the second PCI-E slot.

In an embodiment of the invention, the motherboard module further includes a ROM storing a BIOS; a chipset, wherein the ROM is electrically connected to the CPU via the chipset; and a memory electrically connected to the CPU.

In an embodiment of the invention, if the first expansion card is not inserted in the first PCI-E slot and the second expansion card is inserted in the second PCI-E slot, then 1st to a-th of the PCI-E lanes are formed between 1st to a-th of the processor pin sets of the CPU and the (2N−a+1)th to 2N-th second PCI-E pin sets of the second PCI-E slot and (a+1)th to 2N-th of the PCI-E lanes are formed between (a+1)th to 2N-th of the processor pin sets of the CPU and 1st to (2N−a)th of the second PCI-E pin sets of the second PCI-E slot.

In an embodiment of the invention, if the first expansion card is inserted in the first PCI-E slot and the second expansion card is inserted in the second PCI-E slot, then 1st to a-th of the PCI-E lanes are formed between 1st to a-th of the processor pin sets of the CPU and 1st to a-th of the first PCI-E pin sets of the first PCI-E slot and (a+1)th to 2N-th of the PCI-E lanes are formed between (a+1)th to 2N-th of the processor pin sets of the CPU and 1st to (2N−a)th of the second PCI-E pin sets of the second PCI-E slot.

In an embodiment of the invention, the first expansion card is inserted in the first PCI-E slot and the second expansion card is not inserted in the second PCI-E slot, 1st to a-th of the PCI-E lanes are formed between 1st to a-th of the processor pin sets of the CPU and 1st to a-th of the first PCI-E pin sets of the first PCI-E slot and (a+1)th to 2N-th of the PCI-E lanes are formed between (a+1)th to 2N-th of the processor pin sets of the CPU and (a+1)th to 2N-th of the first PCI-E pin sets of the first PCI-E slot.

In an embodiment of the invention, 2N is 16.

In an embodiment of the invention, a is N.

In an embodiment of the invention, a is not N.

In an embodiment of the invention, the first switch and the second switch respectively include a plurality of small switches, the first input terminal and the first output terminal are formed together by the small switches of the first switch, and the second input terminal and the second output terminal are formed together by the small switches of the second switch.

Based on the above, since the PCI-E lanes need to be assigned from the leftmost PCI-E pin set to the right in each PCI-E slot in order, but the numbering of the PCI-E lanes is not limited to increasing or decreasing. Therefore, the motherboard module having switchable PCI-E lanes of the invention includes two switches, and 1st to a-th processor pin sets of the CPU are switchably electrically connected to 1st to a-th of the first PCI-E pin sets of the first PCI-E slot or (2N−a+1)th to 2N-th of the second PCI-E pin sets of the second PCI-E slot via the first switch to form PCI-E lanes whose number is a. And (a+1)th to 2N-th processor pin sets of the CPU are switchably electrically connected to (a+1)th to 2N-th of the first PCI-E pin sets of the first PCI slot or 1st to (2N−a)th of the second PCI-E pin sets of the second PCI-E slot via the second switch to form PCI-E lanes whose number is 2N−a. After the BIOS detects that the second expansion card is inserted in the second PCI-E slot, the BIOS instructs the CPU to switch the first switch and the second switch and reverse the order of PCI-E lanes provided to the second PCI-E slot such that 1st, 2nd, 3rd . . . second PCI-E pin sets of the second PCI-E slot are assigned to 2N-th, (2N−1)th, (2N−2)th . . . PCI-E lanes of the CPU in order. If the first expansion card is not inserted in the first PCI-E slot, then all of the PCI-E lanes are assigned to the second PCI-E slot, such that the second PCI-E slot can receive the complete PCI-E signal. If the first expansion card is inserted in the first PCI-E slot, then a portion of the PCI-E lanes are assigned to the first PCI-E slot, and another portion of the PCI-E lanes are assigned to the second PCI-E slot, such that the dual expansion cards can still be operated together.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
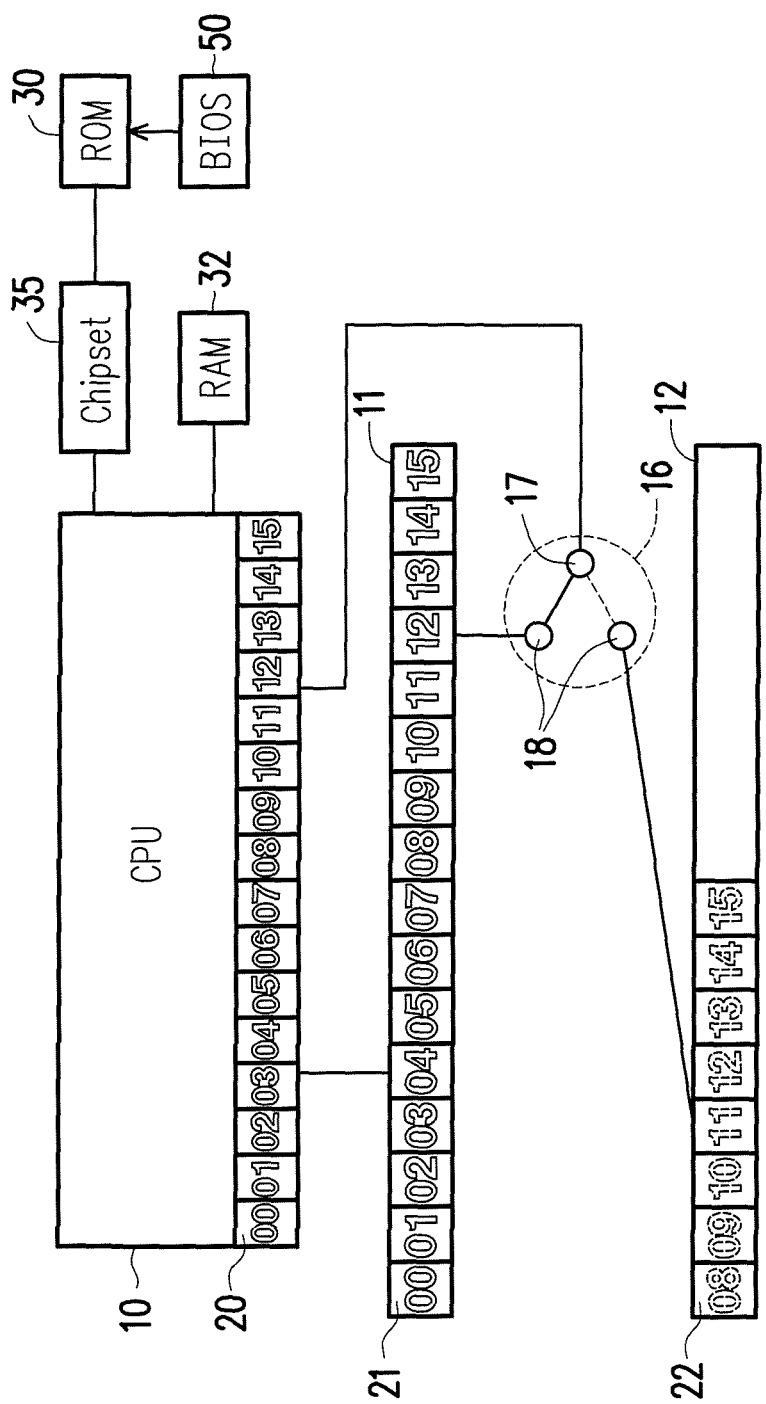
FIG. 1 and FIG. 2 are schematics of PCI-E lanes of a known CPU assigned in two PCI-E slots.
Figure 2:
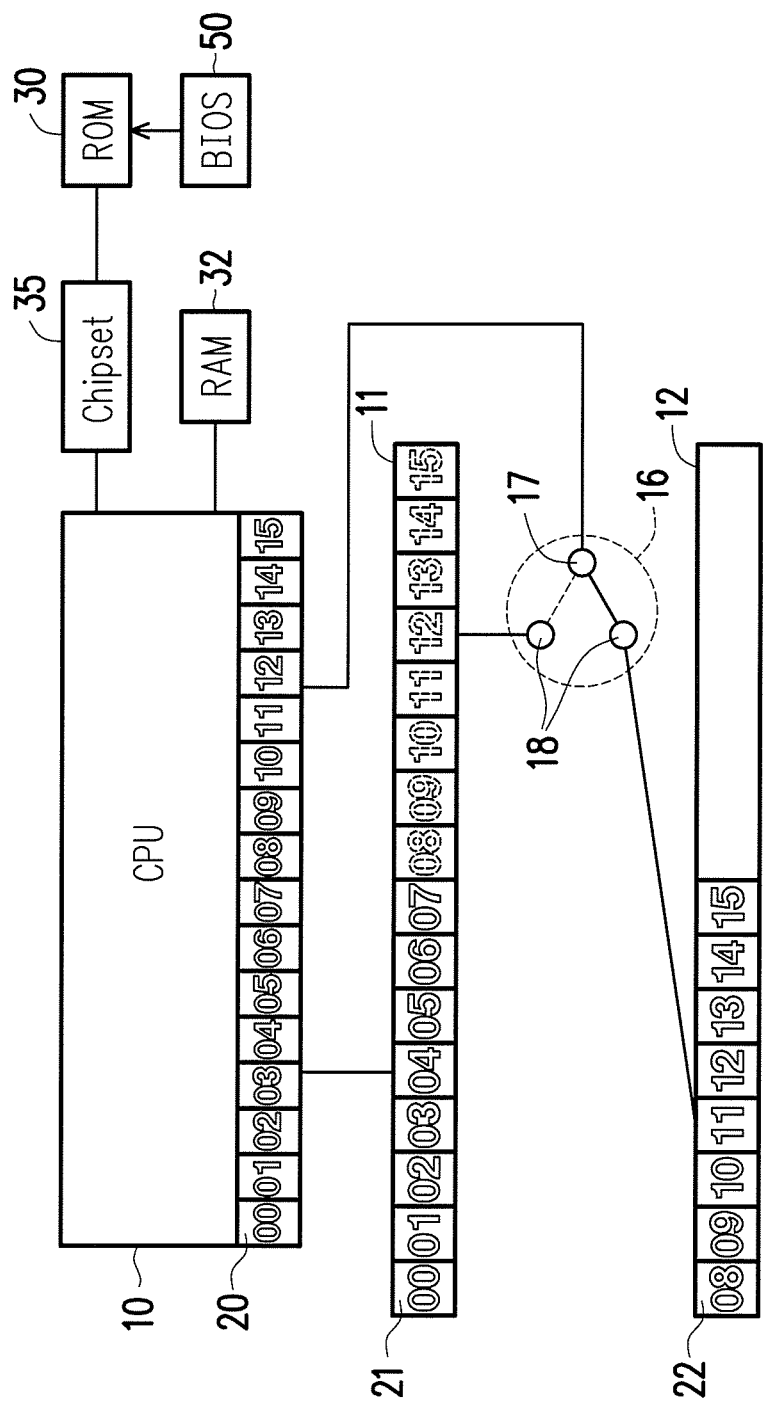
Figure 3:
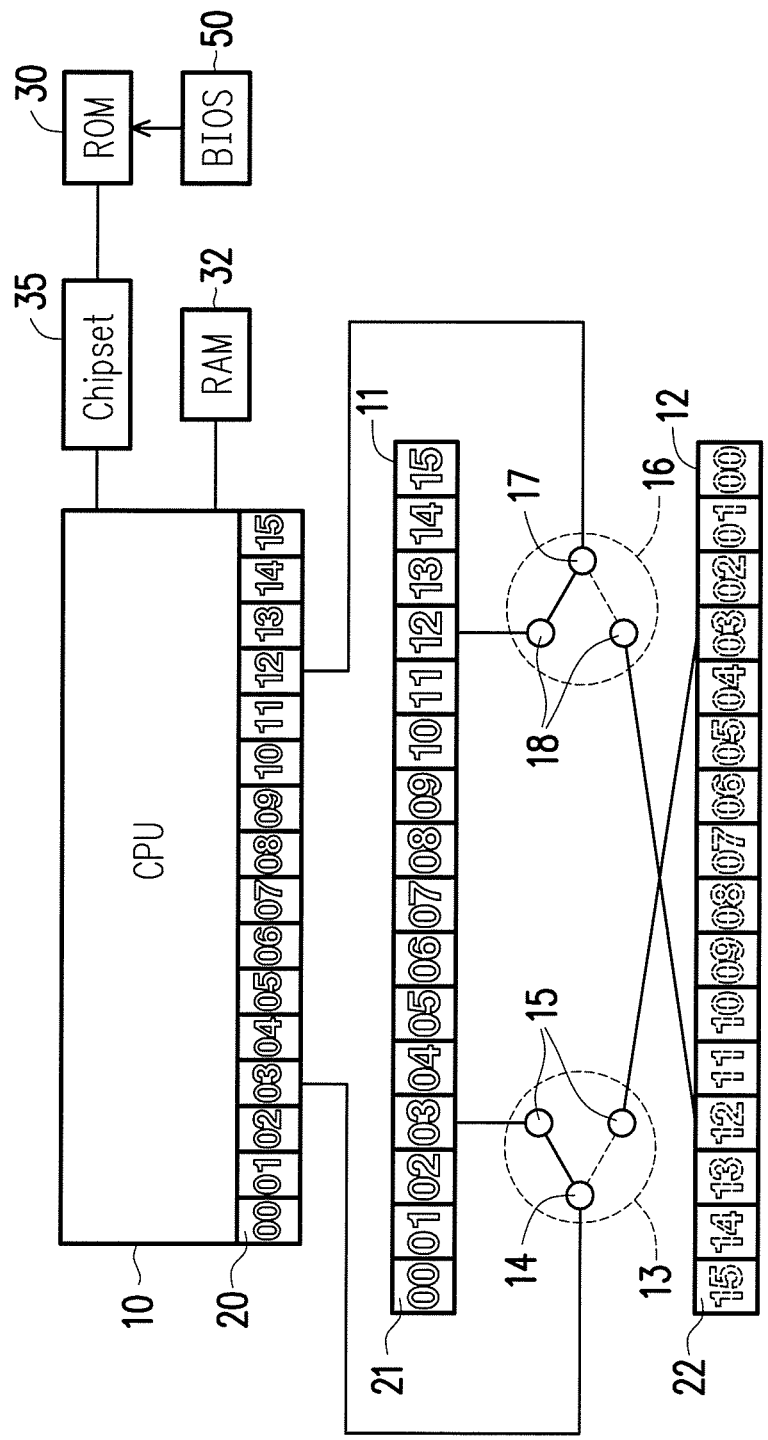
FIG. 3 to FIG. 5 are schematics of PCI-E lanes of a CPU assigned in two PCI-E slots according to an embodiment of the invention.
Figure 4:
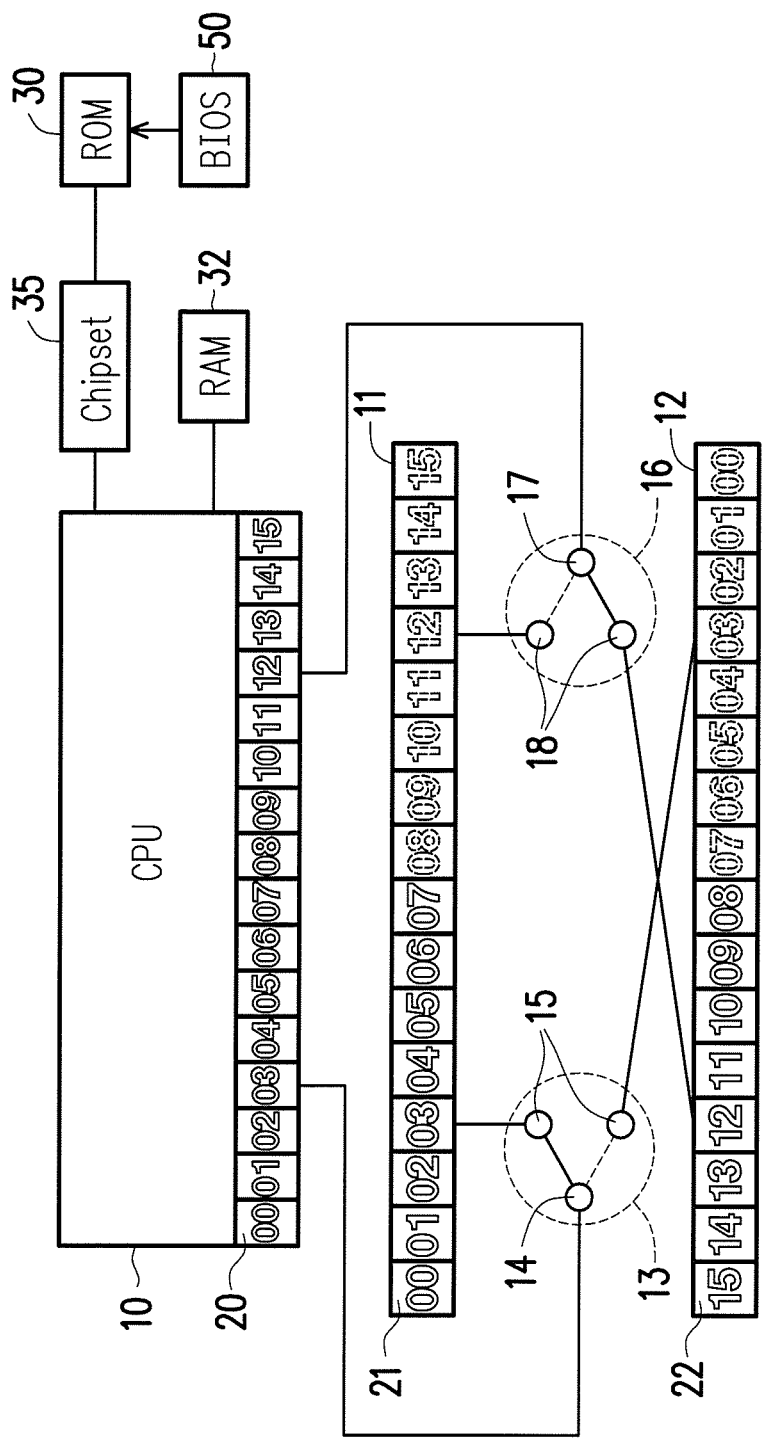
Figure 5:
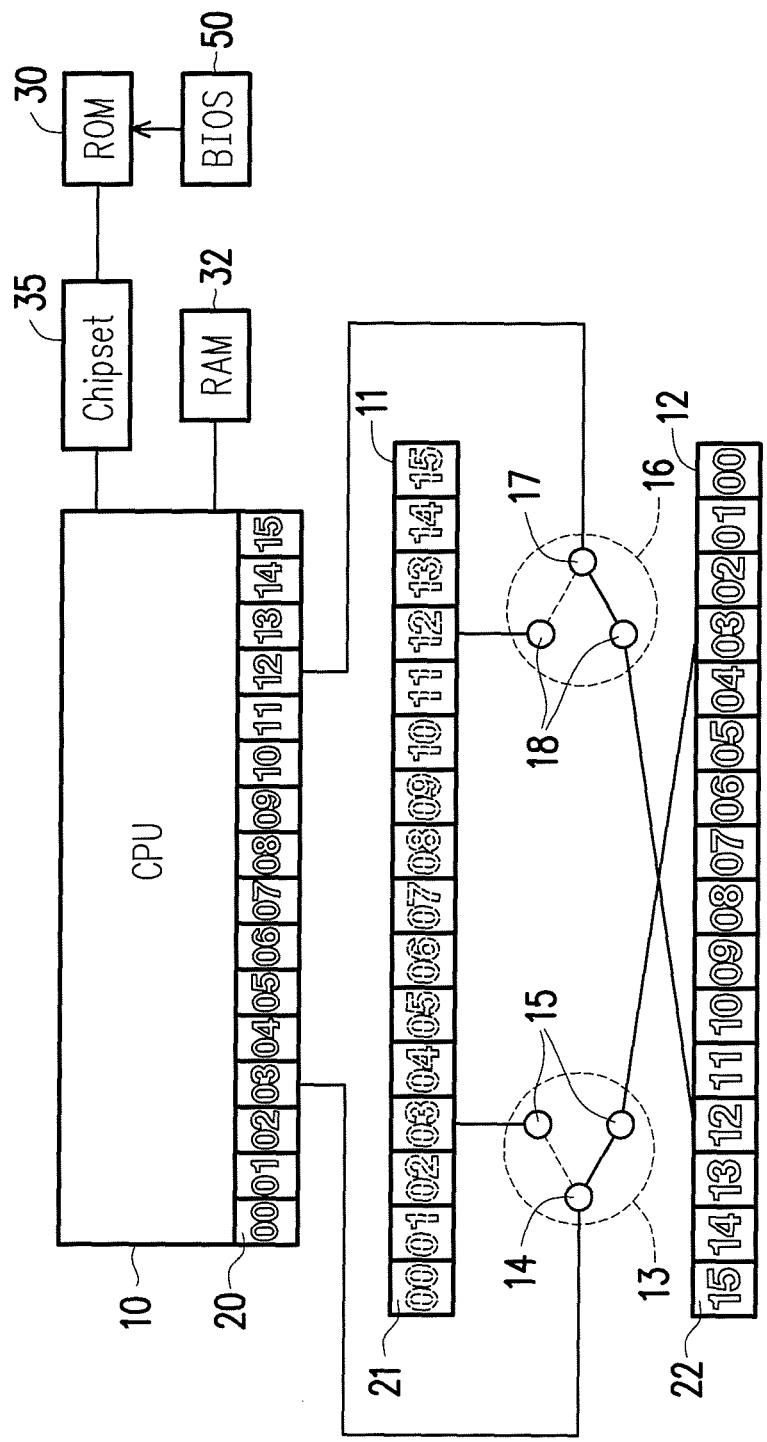

FIG. 3 to FIG. 5 are schematics of PCI-E lanes of a CPU 10 assigned in two PCI-E slots according to an embodiment of the invention. Referring first to FIG. 3 to FIG. 5, a motherboard module 1 having switchable PCI-E lanes includes the CPU 10, a first PCI-E slot 11, a second PCI-E slot 12, a first switch 13, a second switch 16, a ROM 30, and a memory 32. The ROM 30 stores a BIOS 50. The memory 32 is electrically connected to the CPU 10.

In general, when a user presses the power button to start a computer system, the BIOS 50 stored in the ROM 30 is electrically connected to the CPU 10 via a chipset 35, and the BIOS 50 is loaded in the memory 32 and prepares to perform initialization and checking operations on the hardware devices of the computer system. The BIOS 50 performs initialization operations on the CPU 10, the chipset 35, the memory 32, and peripheral devices, and confirms which peripheral devices are connected to the motherboard, and after ensuring that the hardware devices are operating normally upon completion of the booting process, the operating system is loaded into the memory 32 to complete the booting process of the computer system.

For the stage in which the BIOS 50 confirms which peripheral devices are connected to the motherboard, since the motherboard module 1 having switchable PCI-E lanes is provided with two PCI-E slots (a first PCI-E slot 11 and a second PCI-E slot 12), the BIOS 50 detects which PCI-E slots the PCI-E expansion cards are inserted in, and instructs the CPU 10 how to switch the first switch 13 and the second switch 16 according to the detection results, such that the PCI-E lanes are assigned to the first PCI-E slot 11 (generally the PCI-E slot adjacent to the CPU 10) and/or the second PCI-E slot 12 (generally the PCI-E slot farther from the CPU 10), and instructs the CPU 10 how to assign the order of the PCI-E lanes. Therefore, even if the PCI-E expansion card is only inserted in the second PCI-E slot 12, the motherboard module 1 having switchable PCI-E lanes of the present embodiment can assign all of the PCI-E lanes to the second PCI-E slot 12 such that the second PCI-E slot 12 can receive the complete PCI-E signal. Details are provided below.

It should be mentioned first that, the CPU 10, the first PCI-E slot 11, and the second PCI-E slot 12 of the motherboard module 1 having switchable PCI-E lanes of the present embodiment respectively support PCI-E lanes whose number is 2N, and the first PCI-E slot 11 and the second PCI-E slot 12 are respectively electrically connected to the CPU 10. In the present embodiment, 2N is 16 as an example, but the quantity of 2N can also be, for instance, 4, 8, or 32, and is not limited to 16.

1st to a-th processor pin sets 20 of the CPU 10 are switchably electrically connected to 1st to a-th first PCI-E pin sets 21 of the first PCI-E slot 11 or (2N−a+1)th to 2N-th second PCI-E pin sets 22 of the second PCI-E slot 12 via the first switch 13 to form 1st to a-th PCI-E lanes, and (a+1)th to 2N-th processor pin sets 20 of the CPU 10 are switchably electrically connected to (a+1)th to 2N-th first PCI-E pin sets 21 of the first PCI-E slot 11 or 1st to (2N−a)th second PCI-E pin sets 22 of the second PCI-E slot 12 via the second switch 16 to form (a+1)th to 2N-th PCI-E lanes, wherein 1<a<2N. In the present embodiment, a is N as an example, but in other embodiments, a can also not be half of 2N, i.e., a is not N.

More specifically, in the present embodiment, the CPU 10, the first PCI-E slot 11, and the second PCI-E slot 12 respectively support 16 PCI-E lanes (i.e., ×16 bandwidth). The 16 processor pin sets 20 of the CPU 10 correspond to the 16 PCI-E lanes, and the 16 PCI-E lanes are numbered 00 to 15 in order, wherein in the CPU 10, the 1st to 8th processor pin sets 20 of FIG. 3 from the left correspond to the PCI-E lanes numbered 00 to 07, the 1st to 8th processor pin sets 20 are connected to a first input terminal 14 of the first switch 13, and a first output terminal 15 of the first switch 13 is switchably electrically connected to 1st to 8th first PCI-E pin sets 21 from the left or 9th to 16th second PCI-E pin sets 22 of the second PCI-E slot 12 of FIG. 3 to form 1st to a-th PCI-E lanes.

The 9th to 16th processor pin sets 20 of the CPU 10 correspond to the PCI-E lanes numbered 08 to 15, and are connected to a second input terminal 17 of the second switch 16. A second output terminal 18 of the second switch 16 is switchably electrically connected to the 9th to 16th first PCI-E pin sets 21 of the first PCI-E slot 11 or the 1st to 8th second PCI-E pin sets 22 of the second PCI-E slot 12 to form (a+1)th to 2N-th PCI-E lanes.

It should be mentioned that, in actuality, the first switch 13 and the second switch 16 can each further have a plurality of small switches (not shown). The small switches of the first switch 13 form the first input terminal 14 and the first output terminal 15 together to switch a portion of the lanes together. The small switches of the second switch 16 form the second input terminal 17 and the second output terminal 18 together to switch another portion of the lanes together. For instance, if one small switch can switch 2 lanes, then the first switch 13 and the second switch 16 can each have 4 small switches. Of course, the quantity of small switches of the first switch 13 and the second switch 16 is not limited thereto. Of course, if the first switch 13 and the second switch 16 themselves can respectively switch 16 lanes, then the first switch 13 and the second switch 16 can also respectively be a single switch.

It should be mentioned that, the order of the PCI-E lanes of the first PCI-E slot 11 and the order of the PCI-E lanes of the second PCI-E slot 12 are reversed. The reason is that the assignment rule of the operable PCI-E lanes in each PCI-E slot is assigned from the leftmost PCI-E pin set to the rightward PCI-E pin sets in each PCI-E slot in order (left to right arrangement in the figure). In other words, as long as the leftmost PCI-E pin set and other numerically successive PCI-E pin sets in each PCI-E slot are assigned and the numbering of the assigned PCI-E lanes is consecutive, and the numbering of the assigned PCI-E lanes is not limited to increasing or decreasing.

Therefore, to make all three modes in which the first expansion card is only inserted in the first PCI-E slot 11 (FIG. 3), the first expansion card and the second expansion card are inserted in both the first PCI-E slot 11 and the second PCI-E slot 12 (FIG. 4), and the second expansion card is only inserted in the second PCI-E slot 12 (FIG. 5) work and to allow the second PCI-E slot 12 to be assigned to the complete 16 PCI-E lanes when the second expansion card is only inserted in the second PCI-E slot 12, in the motherboard module 1 having switchable PCI-E lanes of the present embodiment, reversed numbering is particularly assigned to the lanes of the second PCI-E slot 12 from left to right. Examples are provided below.

Actual operation is as follows. First, in the booting stage, the BIOS 50 obtains information of whether a first expansion card and a second expansion card are respectively inserted in the first PCI-E slot 11 and the second PCI-E slot 12. In actuality, three conditions exist. First, the first expansion card is only inserted in the first PCI-E slot 11 (as shown in FIG. 3). Second, the first expansion card and the second expansion card are inserted in both the first PCI-E slot 11 and the second PCI-E slot 12 (as shown in FIG. 4). Third, the second expansion card is only inserted in the second PCI-E slot 12 (as shown in FIG. 5).

In the first case, if the first expansion card is inserted in the first PCI-E slot 11 and the second expansion card is not inserted in the second PCI-E slot 12, i.e., the case of FIG. 3, then the CPU 10 correspondingly switches the first switch 13 and the second switch 16, 1st to a-th PCI-E lanes are formed between 1st to a-th processor pin sets 20 of the CPU 10 and 1st to a-th first PCI-E pin sets 21 of the first PCI-E slot 11, (a+1)th to 2N-th PCI-E lanes are formed between (a+1)th to 2N-th processor pin sets 20 of the CPU 10 and (a+1)th to 2N-th first PCI-E pin sets 21 of the first PCI-E slot, and the BIOS 50 instructs the CPU 10 to provide PCI-E lanes whose number is 2N in the original order to the first PCI-E slot 11. More specifically, if the first expansion card is only inserted in the first PCI-E slot 11, then the BIOS 50 instructs the CPU 10 to assign 16 PCI-E lanes to the first PCI-E slot 11 in the original order.

In the second case, if the first expansion card is inserted in the first PCI-E slot 11 and the second expansion card is inserted in the second PCI-E slot 12, i.e., the case of FIG. 4, then the CPU 10 correspondingly switches the first switch 13 and the second switch 16, 1st to a-th PCI-E lanes are formed between 1st to a-th processor pin sets 20 of the CPU 10 and 1st to a-th first PCI-E pin sets 21 of the first PCI-E slot 11, (a+1)th to 2N-th PCI-E lanes are formed between (a+1)th to 2N-th processor pin sets 20 of the CPU 10 and 1st to (2N−a)th second PCI-E pin sets 22 of the second PCI-E slot 12, and the BIOS 50 instructs the CPU 10 to provide a PCI-E lanes in the original order to the first PCI-E slot 11 and provide 2N−a PCI-E lanes in the reverse order to the second PCI-E slot 12.

More specifically, the first expansion card and the second expansion card are inserted in both the first PCI-E slot 11 and the second PCI-E slot 12, the BIOS 50 instructs the CPU 10 to assign the 8 PCI-E lanes numbered 00 to 07 to the first eight first PCI-E pin sets 21 of the first PCI-E slot 11, and assign the 8 PCI-E lanes numbered 08 to 15 to the first eight second PCI-E pin sets 22 of the second PCI-E slot 12 in the reverse direction. The first PCI-E slot 11 and the second PCI-E slot 12 can operate as long as the consecutive 8 PCI-E lanes from the left are assigned to the consecutively-numbered PCI-E lanes, and the numbering can be decreasing or increasing. In the case of FIG. 4, the numbering of the first eight first PCI-E pin sets 21 of the first PCI-E slot 11 assigned to the PCI-E lanes in order is increasing (00 to 07), and the numbering of the first eight second PCI-E pin sets 22 of the second PCI-E slot 12 assigned to the PCI-E lanes in order is decreasing (15 to 08). In this case, the operable bandwidth of the first PCI-E slot 11 and the second PCI-E slot 12 is each 8 PCI-E lanes, i.e., ×8, ×8 mode.

In the third case, if the first expansion card is not inserted in the first PCI-E slot 11 and the second expansion card is inserted in the second PCI-E slot 12, i.e., the case of FIG. 5, then the CPU 10 correspondingly switches the first switch 13 and the second switch 16, 1st to a-th PCI-E lanes are formed between 1st to a-th processor pin sets 20 of the CPU 10 and (2N−a+1)th to 2N-th second PCI-E pin sets 22 of the second PCI-E slot 12, (a+1)th to 2N-th PCI-E lanes are formed between (a+1)th to 2N-th processor pin sets 20 of the CPU 10 and 1st to (2N−a)th second PCI-E pin sets 22 of the second PCI-E slot 12, and the BIOS 50 instructs the CPU 10 to provide PCI-E lanes whose number is 2N in reverse order to the second PCI-E slot 12.

More specifically, if the second expansion card is only inserted in the second PCI-E slot 12, then the BIOS 50 instructs the CPU 10 to assign all of the 16 PCI-E lanes to the second PCI-E slot 12 in reverse order, the 16 second PCI-E pin sets 22 of the second PCI-E slot 12 are assigned to the PCI-E lanes numbered in decreasing order (15 to 00) in order, and the second PCI-E slot 12 can receive the complete PCI-E signal.

Based on the above, since the PCI-E lanes need to be assigned from the leftmost PCI-E pin group to the right in each PCI-E slot in order, but the numbering of the PCI-E lanes is not limited to increasing or decreasing. Therefore, the motherboard module having switchable PCI-E lanes of the invention includes two switches, and 1st to a-th processor pin sets of the CPU are switchably electrically connected to 1st to a-th of the first PCI-E pin sets of the first PCI-E slot or (2N−a+1)th to 2N-th of the second PCI-E pin sets of the second PCI-E slot via the first switch to form PCI-E lanes whose number is a. And (a+1)th to 2N-th processor pin sets of the CPU are switchably electrically connected to (a+1)th to 2N-th of the first PCI-E pin sets of the first PCI slot or 1st to (2N−a)th of the second PCI-E pin sets of the second PCI-E slot via the second switch to form PCI-E lanes whose number is 2N−a. After the BIOS 50 detects that the second expansion card is inserted in the second PCI-E slot, the BIOS 50 instructs the CPU to switch the first switch and the second switch and reverse the order of PCI-E lanes provided to the second PCI-E slot such that the 1st, 2nd, 3rd . . . second PCI-E pin sets of the second PCI-E slot are assigned to the 2N-th, (2N−1)th, (2N−2)th . . . PCI-E lanes of the CPU in order. If the first expansion card is not inserted in the first PCI-E slot, then all of the PCI-E lanes are assigned to the second PCI-E slot, such that the second PCI-E slot can receive the complete PCI-E signal. If the first expansion card is inserted in the first PCI-E slot, then a portion of the PCI-E lanes are assigned to the first PCI-E slot, and another portion of the PCI-E lanes are assigned to the second PCI-E slot, such that the dual expansion cards can still be operated together.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A motherboard module having switchable PCI-E lanes, comprising:
   a CPU comprising 2N processor pin sets;
   a first PCI-E slot electrically connected to the CPU and comprising 2N first PCI-E pin sets;
   a second PCI-E slot electrically connected to the CPU and comprising 2N second PCI-E pin sets;
   a first switch comprising a first input terminal and a first output terminal which is switchable; and
   a second switch comprising a second input terminal and a second output terminal which is switchable, wherein
   the 1st to a-th processor pin sets of the CPU are electrically connected to the first input terminal, and the first output terminal is switchably electrically connected to the 1st to a-th of the first PCI-E pin sets of the first PCI-E slot or the (2N−a+1)th to 2N-th of the second PCI-E pin sets of the second PCI-E slot to form PCI-E lanes whose number is a,
   the (a+1)th to 2N-th processor pin sets of the CPU are electrically connected to the second input terminal, and the second output terminal is switchably electrically connected to the (a+1)th to 2N-th of the first PCI-E pin sets of the first PCI-E slot or the 1st to (2N−a)th of the second PCI-E pin sets of the second PCI-E slot to form PCI-E lanes whose number is 2N−a, wherein 1<a<2N.

2. The motherboard module having switchable PCI-E lanes of claim 1, further comprising:
   a BIOS receiving a signal of whether a first expansion card and a second expansion card are inserted in the first PCI-E slot and the second PCI-E slot, wherein when the second expansion card is inserted in the second PCI-E slot, the BIOS instructs the CPU to reverse an order of the electrically-connected PCI-E lanes between the CPU and the second PCI-E slot.

3. The motherboard module having switchable PCI-E lanes of claim 2, further comprising:
   a ROM storing the BIOS;
   a chipset, wherein the ROM is electrically connected to the CPU via the chipset; and
   a memory electrically connected to the CPU.

4. The motherboard module having switchable PCI-E lanes of claim 1, wherein if the first expansion card is not inserted in the first PCI-E slot and the second expansion card is inserted in the second PCI-E slot, then the 1st to a-th of the PCI-E lanes are formed between the 1st to a-th of the processor pin sets of the CPU and the (2N−a+1)th to 2N-th second PCI-E pin sets of the second PCI-E slot, and the (a+1)th to 2N-th of the PCI-E lanes are formed between the (a+1)th to 2N-th of the processor pin sets of the CPU and the 1st to (2N−a)th of the second PCI-E pin sets of the second PCI-E slot.

5. The motherboard module having switchable PCI-E lanes of claim 1, wherein if the first expansion card is inserted in the first PCI-E slot and the second expansion card is inserted in the second PCI-E slot, then the 1st to a-th of the PCI-E lanes are formed between the 1st to a-th of the processor pin sets of the CPU and the 1st to a-th of the first PCI-E pin sets of the first PCI-E slot, and the (a+1)th to 2N-th of the PCI-E lanes are formed between the (a+1)th to 2N-th of the processor pin sets of the CPU and the 1st to (2N−a)th of the second PCI-E pin sets of the second PCI-E slot.

6. The motherboard module having switchable PCI-E lanes of claim 1, wherein if the first expansion card is inserted in the first PCI-E slot and the second expansion card is not inserted in the second PCI-E slot, then the 1st to a-th of the PCI-E lanes are formed between the 1st to a-th of the processor pin sets of the CPU and the 1st to a-th of the first PCI-E pin sets of the first PCI-E slot, and the (a+1)th to 2N-th of the PCI-E lanes are formed between the (a+1)th to 2N-th of the processor pin sets of the CPU and the (a+1)th to 2N-th of the first PCI-E pin sets of the first PCI-E slot.

7. The motherboard module having switchable PCI-E lanes of claim 4, wherein 2N is 16.

8. The motherboard module having switchable PCI-E lanes of claim 5, wherein 2N is 16.

9. The motherboard module having switchable PCI-E lanes of claim 6, wherein 2N is 16.

10. The motherboard module having switchable PCI-E lanes of claim 1, wherein a is N.

11. The motherboard module having switchable PCI-E lanes of claim 1, wherein a is not N.

12. The motherboard module having switchable PCI-E lanes of claim 1, wherein the first switch and the second switch respectively comprise a plurality of small switches, the first input terminal and the first output terminal are formed together by the small switches of the first switch, and the second input terminal and the second output terminal are formed together by the small switches of the second switch.

13. The motherboard module having switchable PCI-E lanes of claim 2, wherein if the first expansion card is not inserted in the first PCI-E slot and the second expansion card is inserted in the second PCI-E slot, then the 1st to a-th of the PCI-E lanes are formed between the 1st to a-th of the processor pin sets of the CPU and the (2N−a+1)th to 2N-th second PCI-E pin sets of the second PCI-E slot, and the (a+1)th to 2N-th of the PCI-E lanes are formed between the (a+1)th to 2N-th of the processor pin sets of the CPU and the 1st to (2N−a)th of the second PCI-E pin sets of the second PCI-E slot.

14. The motherboard module having switchable PCI-E lanes of claim 2, wherein if the first expansion card is inserted in the first PCI-E slot and the second expansion card is inserted in the second PCI-E slot, then the 1st to a-th of the PCI-E lanes are formed between the 1st to a-th of the processor pin sets of the CPU and the 1st to a-th of the first PCI-E pin sets of the first PCI-E slot, and the (a+1)th to 2N-th of the PCI-E lanes are formed between the (a+1)th to 2N-th of the processor pin sets of the CPU and the 1st to (2N−a)th of the second PCI-E pin sets of the second PCI-E slot.

15. The motherboard module having switchable PCI-E lanes of claim 2, wherein if the first expansion card is inserted in the first PCI-E slot and the second expansion card is not inserted in the second PCI-E slot, then the 1st to a-th of the PCI-E lanes are formed between the 1st to a-th of the processor pin sets of the CPU and the 1st to a-th of the first PCI-E pin sets of the first PCI-E slot, and the (a+1)th to 2N-th of the PCI-E lanes are formed between the (a+1)th to 2N-th of the processor pin sets of the CPU and the (a+1)th to 2N-th of the first PCI-E pin sets of the first PCI-E slot.

16. The motherboard module having switchable PCI-E lanes of claim 13, wherein 2N is 16.

17. The motherboard module having switchable PCI-E lanes of claim 14, wherein 2N is 16.

18. The motherboard module having switchable PCI-E lanes of claim 15, wherein 2N is 16.

* * * * *